Patented Jan. 6, 1953

2,624,743

UNITED STATES PATENT OFFICE 2,624,743

N-ALPHA-THENYL ANILINES

Lucas P. Kyrides, Zeeland, Mich., assignor to Monsanto Chemical Company, St. Louis, Mo., a corporation of Delaware No Drawing. Application December 20, 1947, Serial No. 793,056

12 Claims. (Cl. 260—329)

This invention relates to a novel thenyl derivative and to a method for its preparation.

One of the objects of the present invention is to prepare as novel compounds, certain N-alpha-thenyl anilines. Another object is to provide a process for preparing certain N-alpha-thenyl anilines. Other objects will become apparent from the following description.

According to the present invention, generally stated, N-alpha-thenyl aniline having the formula:

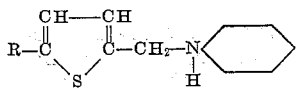

in which R represents hydrogen, methyl, chlorine, or bromine, may be prepared by heating a mixture of the appropriate alpha-thenyl chloride or alpha-thenyl bromide and aniline and subsequently recovering the corresponding N-alpha-thenyl aniline from the reaction mixture, for example, by adding water, alkalizing the mixture with caustic soda, separating the non-aqueous or aniline layer and washing, drying and fractionally distilling the non-aqueous layer.

The following examples will serve to illustrate the novel products of the present invention and their preparation.

Example I

To 137.7 g. (1.5 moles) of aniline heated at 100–110° C. was slowly added 39.8 g. (0.3 mole) of alpha-thenyl chloride. The reaction mixture was heated for approximately 4 hours at 100–110° C. and was allowed to stand overnight. To the reaction mixture was added 100 cc. of water and thereafter sufficient caustic soda solution to render the mixture alkaline. The mixture separated into two layers and the non-aqueous layer was isolated, washed with salt water, dried and fractionally distilled. From the distillation was recovered 104 g. of unreacted aniline and 39.4 g. (69.5% yield) of N-alpha-thenyl aniline, B. P. 169–171° C./8 mm. A high boiling residue weighing 12.6 g. remained in the distillation flask.

Example II

To 1.5 moles of aniline heated at 100–110° C. was slowly added 0.3 mole of 2-chloromethyl-5-chloro-thiophene. The reaction mixture was heated for approximately 4 hours at 100–110° C. and was allowed to stand overnight. The reaction mixture was then processed according to the procedure described in Example I. The product recovered was N-(5-chloro-2-thenyl) aniline. In place of 2-chloromethyl-5-chloro-thiophene in the present example, 0.3 mole of 2-bromomethyl-5-chloro-thiophene may be employed.

Example III

To 1.5 moles of aniline heated at 100–110° C. was slowly added 0.3 mole of 2-chloromethyl-5-bromo-thiophene. The reaction mixture was heated for approximately 4 hours at 100–110° C. and was allowed to stand overnight. The reaction mixture was then processed according to the procedure described in Example I. The product recovered from the reaction mixture was N-(5-bromo-2-thenyl) aniline. In place of 2-chloromethyl-5-bromo-thiophene in the present example, 0.3 mole of 2-bromomethyl-5-bromo thiophene may be employed.

Example IV

To 1.5 moles of aniline heated at 100–110° C. was slowly added 0.3 mole of 2-chloromethyl-5-methyl-thiophene. The reaction mixture was heated for approximately 4 hours at approximately 100–110° C. and was allowed to stand overnight. The reaction mixture was then processed according to the procedure of Example I. The product recovered from the reaction mixture was N-(5-methyl-2-thenyl) aniline. In place of 2-chloromethyl-5-methyl-thiophene in the present example, 0.3 mole of 2-bromo-methyl-5-methyl-thiophene may be employed.

While certain conditions and proportions of the reactants have been described hereinabove, it is to be understood that the present invention is not to be limited to these conditions and proportions, but these may be varied over a wide range depending upon the circumstances under which the reaction is conducted. The reaction may be conducted at temperatures lower than 100–110° C., for example, at room temperature (25–30° C.) for a longer period of time. The preferred operation, however, is that in which the temperature is in the range of 100–110° C. The novel products of the present invention, N-alpha-thenyl anilines of the types herein described and their acid salts, such as the hydrochlorides, acetates and sulfates, are useful as an intermediate in the preparation of dyestuffs, wetting, dispersing and emulsifying agents, insecticides, toxicants and numerous other materials. The acid salts of the free base compounds may be prepared by reacting the compounds with aqueous or alcohol solutions of the corresponding acids and recovering the salts thus formed by any suitable means, for example, by evaporation and recrystallization.

I claim:

1. An N-alpha-thenyl aniline having the formula:

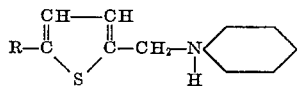

in which R represents a radical selected from the group consisting of hydrogen, methyl, chlorine, and bromine radicals and the acid salts thereof.

2. N-alpha-thenyl aniline having the formula:

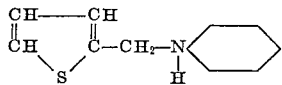

and the acid salts thereof.

3. N-(5-chloro-2-thenyl) aniline having the formula:

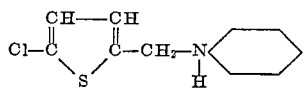

and the acid salts thereof.

4. N-(5-bromo-2-thenyl) aniline having the formula:

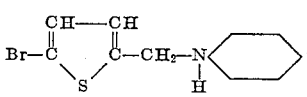

and the acid salts thereof.

5. A process of making N-alpha-thenyl anilines having the formula:

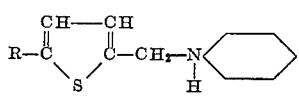

in which R represents a radical selected from the group consisting of hydrogen, methyl, chlorine and bromine radicals comprising heating a mixture of an alpha-thenyl halide having the formula:

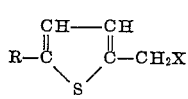

in which R represents a radical selected from the group consisting of hydrogen, methyl, chlorine and bromine radicals, and X represents a radical selected from the group consisting of chlorine and bromine, and aniline at a temperature within the range of approximately 100–110° C. until the reaction is complete and recovering the N-alpha-thenyl aniline product from the reaction mixture.

6. A process of making an N-alpha-thenyl aniline having the formula:

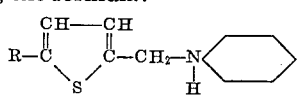

in which R represents a radical selected from the group consisting of hydrogen, methyl, chlorine and bromine, comprising heating a mixture of an alpha-thenyl halide having the formula:

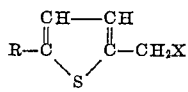

in which R represents a radical selected from the group consisting of hydrogen, methyl, chlorine and bromine, and X represents a radical selected from the group consisting of chlorine and bromine, and aniline at a temperature in the range of approximately 100–110° C. for approximately 4 hours, diluting the reaction mixture with water, alkalizing the reaction mixture, isolating the non-aqueous layer, and subsequently recovering the N-alpha-thenyl aniline from said layer.

7. A process of making N-alpha-thenyl aniline comprising heating a mixture of alpha-thenyl chloride and aniline at a temperature within the range of approximately 100–110° C. until the reaction is complete and recovering N-alpha-thenyl aniline from the reaction mixture.

8. A process of making N-alpha-thenyl aniline comprising heating a mixture of alpha-thenyl chloride and aniline at a temperature in the range of approximately 100–110° C. for approximately 4 hours, diluting the reaction mixture with water, alkalizing the reaction mixture, isolating the non-aqueous layer, and subsequently recovering the N-alpha-thenyl aniline from said layer.

9. A process of making N-(5-chloro-2-thenyl) aniline comprising heating a mixture of an alpha-thenyl halide having the formula:

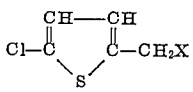

in which X represents a radical selected from the group consisting of chlorine and bromine, and aniline at a temperature within the range of approximately 100–110° C. until the reaction is complete and recovering N-(5-chloro-2-thenyl) aniline from the reaction mixture.

10. A process of making N-(5-bromo-2-thenyl) aniline comprising heating a mixture of an alpha-thenyl halide having the formula:

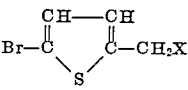

in which X represents a radical selected from the group consisting of chlorine and bromine, and aniline at a temperature within the range of approximately 100–110° C. until the reaction is complete and recovering N-(5-bromo-2-thenyl) aniline from the reaction mixture.

11. A process of making N-alpha-thenyl anilines having the formula:

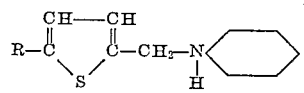

in which R represents a radical selected from the group consisting of hydrogen, methyl, chlorine and bromine radicals comprising reacting a mixture of an alpha-thenyl halide having the formula:

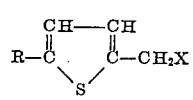

in which R represents a radical selected from the group consisting of hydrogen, methyl, chlorine and bromine radicals, and X represents a radical selected from the group consisting of chlorine and bromine, and aniline until the reaction is complete and recovering the N-alpha-thenyl aniline product from the reaction mixture.

12. A process of making N-alpha-thenyl aniline comprising heating a mixture of alpha-thenyl chloride and aniline and recovering N-alpha-thenyl aniline from the reaction mixture.

LUCAS P. KYRIDES.

REFERENCES CITED

The following references are of record in the file of this patent:

Powers, Advancing Fronts in Chemistry, vol. 2, p. 33, Reinhold Publishing Company, New York, 1946.

Whitmore, "Organic Chemistry," p. 893, Van Nostrand, New York, 1937.

Bernthsen and Sudborough, "Organic Chemistry," p. 549, Van Nostrand, New York, 1922 edition.

Caesar and Sachanen, Ind. Eng. Chem. 40, No. 5, May 1948, p. 922.

Fleischer, Annalen, 138, 225.

Richter, "Organic Chemistry," pp. 649-650, Wiley, New York, 1938.